(12) United States Patent
Boughton et al.

(10) Patent No.: US 10,350,629 B2
(45) Date of Patent: Jul. 16, 2019

(54) IRRIGATION SYSTEM GROUND SPIKE

(71) Applicant: SA EXEL Industries, Paris (FR)

(72) Inventors: Robert Boughton, Twyford (GB); Matt Gossington, Handsacre (GB)

(73) Assignee: SA EXEL INDUSTRIES, Paris (FR)

( * ) Notice: Subject to any disclaimer, the term of this patent is extended or adjusted under 35 U.S.C. 154(b) by 0 days.

(21) Appl. No.: 15/562,785

(22) PCT Filed: Mar. 24, 2016

(86) PCT No.: PCT/GB2016/050853
§ 371 (c)(1),
(2) Date: Sep. 28, 2017

(87) PCT Pub. No.: WO2016/156817
PCT Pub. Date: Oct. 6, 2016

(65) Prior Publication Data
US 2018/0281009 A1   Oct. 4, 2018

(30) Foreign Application Priority Data

Apr. 2, 2015 (GB) .................................. 1505752.4

(51) Int. Cl.
*B05B 15/622* (2018.01)
*A01G 25/02* (2006.01)
(Continued)

(52) U.S. Cl.
CPC ............ *B05B 15/622* (2018.02); *A01G 25/02* (2013.01); *B05B 15/658* (2018.02); *F16L 3/1041* (2013.01)

(58) Field of Classification Search
CPC ..... B05B 15/622; B05B 16/658; A01G 25/02; F16L 3/1041
(Continued)

(56) References Cited

U.S. PATENT DOCUMENTS 3,091,401 A * 5/1963 Hruby, Jr. ............... B05B 1/202
239/269
3,385,525 A   5/1968 Jacobs
(Continued)

FOREIGN PATENT DOCUMENTS

EP   1490617 A1   12/2004
GB   2038974 A   7/1980
(Continued)

OTHER PUBLICATIONS

Patent Cooperation Treaty, International Search Report for PCT/GB2016/050853 dated Jun. 22, 2016, 5 pages.
(Continued)

*Primary Examiner* — Steven J Ganey
(74) *Attorney, Agent, or Firm* — Heslin Rothenberg Farley & Mesiti P.C.; Victor A. Cardona, Esq.

(57) ABSTRACT

An irrigation system ground spike for securing at least one component of an irrigation system includes a spike portion for penetrating soil to hold the ground spike in position and at least two holding portions. Each holding portion holds a respective component of an irrigation system wherein a first of the two holding portions differs from a second of the two portions so facilitating use of the spike for selectively securing respective different components. In particular one of the holding portions is arranged for holding tube or hose of a first diameter and another of the holding portions is arranged for holding tube or hose of a second diameter.

17 Claims, 6 Drawing Sheets

(51) Int. Cl.
*F16L 3/10* (2006.01)
*B05B 15/658* (2018.01)

(58) Field of Classification Search
USPC .......................... 239/266–269, 273, 279, 276
See application file for complete search history.

(56) References Cited

U.S. PATENT DOCUMENTS

| | | |
|---|---|---|
| 3,929,288 A | 12/1975 | Brusadin |
| 4,087,049 A * | 5/1978 | Traina ................... B05B 15/622 |
| | | 239/267 |
| 4,365,750 A | 12/1982 | Carlberg |
| 5,172,515 A | 12/1992 | Lapshansky, Sr. |
| 7,871,022 B1 | 1/2011 | Plyler |
| 2007/0034714 A1 | 2/2007 | Campbell et al. |
| 2008/0054096 A1 * | 3/2008 | Hibberd ................. A01G 25/02 |
| | | 239/276 |

FOREIGN PATENT DOCUMENTS

| | | |
|---|---|---|
| GB | 2421784 A | 7/2006 |
| WO | 2004043136 A2 | 5/2004 |

OTHER PUBLICATIONS

Patent Cooperation Treaty, Written Opinion of the International Searching Authority for PCT/GB2016/050853 dated Jun. 22, 2016, 7 pages.
GB Intellectual Property Office, Search Report under Section 17 for GB Application No. 1505752.4 dated Sep. 2, 2015, 2 pages.

* cited by examiner

IRRIGATION SYSTEM GROUND SPIKE

CROSS REFERENCE TO RELATED APPLICATIONS

This application is a national stage filing under section 371 of International Application No. PCT/GB2016/050853, filed on Mar. 24, 2016, published in English on Oct. 6, 2016, as WO2016/156817 A1 and which claims priority to Great Britain Application No. 1505752.4 filed on Apr. 2, 2015, the entire disclosure of these applications being hereby incorporated herein by reference.

TECHNICAL FIELD

This invention relates to irrigation system ground spikes for securing components in an irrigation system. Typically, ground spikes of the current type will be used in domestic garden irrigation systems, which are sometimes termed micro irrigation systems.

BACKGROUND

Such systems can be useful for the consumer in providing a permanent or semi-permanent watering arrangement for use in gardens, allotments, and so on. However existing micro irrigation systems are generally difficult to set up, install and change. Typically a large number of different products/components are required in order to set up even a relatively simple micro irrigation system and time consuming and fiddly operations are required by a user in installing such a system.

It would be desirable to provide an irrigation system or parts for use in an irrigation system, which can provide easy and safe setup as well an effective resulting system.

SUMMARY

According to one aspect of the invention there is provided an irrigation system ground spike for securing at least one component of an irrigation system, the ground spike comprising a spike portion for penetrating soil to hold the ground spike in position and at least two holding portions, each holding portion for holding a respective component of an irrigation system, wherein a first of the two holding portions differs from a second of the two holding portions so facilitating use of the spike for selectively securing respective different components.

Thus the ground spike may be multi-functional which can enhance ease of use for the user in setting up an irrigation system and reduce the number of components that need to be manufactured.

One of the holding portions may be arranged for holding tube or hose of a first diameter and another of the holding portions may be arranged for holding tube or hose of a second diameter.

One of the holding portions may comprise a micro tube grip.

One of the holding portions may comprise a supply hose securing lug.

One of the holding portions may comprise an irrigation connector attachment portion for attaching an irrigation connector to the ground spike. The irrigation connector will typically be arranged to allow connection of micro tube and/or other irrigation outlet components such as sprinkler units or dripper units to a supply hose.

One of the holding portions may comprise an irrigation outlet component mounting portion for mounting an irrigation outlet component on the ground spike. The irrigation outlet component may, for example, comprise a sprinkler unit or a dripper unit.

The ground spike may comprise any one of, or any combination of: a micro tube grip, a supply hose securing lug, an irrigation connector attachment portion for attaching an irrigation connector to the ground spike, an irrigation outlet component mounting portion for mounting an irrigation outlet component on the ground spike.

The ground spike may comprise a main body portion from which the spike portion projects. The main body portion and spike portion may be of a single piece of material.

The ground spike may be of a single piece of material.

One of the holding portions may comprise a part circular cut out in the main body portion, which cut out is for holding a micro tube. As such the cut out can be considered a mirco tube grip.

One of the holding portions may comprise a supply hose securing lug which projects from the main body portion.

Where the ground spike comprises said part circular cut out and said hose securing lug, the part circular cut out may define a tube receiving region having a mouth through which tube may be introduced whilst the securing lug and main body may define a hose receiving region having a mouth through which hose may be introduced, wherein the mouth of the tube receiving region is smaller than the mouth of the hose receiving region.

The ground spike may comprise a pair of opposing arms extending from the main body portion. The irrigation connector attachment portion and/or the irrigation outlet component mounting portion may comprise the opposing arms. The arms may define a slot for receiving an attachment portion of an irrigation connector. The arms may define a receiving location for accepting an irrigation outlet component.

The arms may be generally L-shaped in cross section.

The arms may define a first slot between the pair of arms on the one hand and the main body portion in the other hand. The arms may define a second slot transverse to the first slot and between the arms themselves. The second slot may be a keyhole shaped slot. In such a case, a larger dimensioned portion of the keyhole shaped slot may provide the receiving location. An irrigation outlet component may be slid into engagement with the arms. The arms may be resilient.

A groove may be provided in the main body portion to act as a guide for micro tube.

Grips may be provided on the main body portion to assist a user in removing the ground spike from the ground.

There may be a pair of hose retaining lugs, each may project from a respective side of the main body portion. Said respective sides may be opposite sides. The lugs may also be useful in removing the ground spike from the ground.

The spike portion may comprise at least one strengthening longitudinal rib.

According to another aspect of the invention there is provided an irrigation connector arrangement comprising ground spike, as defined above, and an irrigation connector attached to the ground spike.

The irrigation connector may be arranged for tapping into a water supply hose and may comprise a retaining portion for holding a supply hose in a hose receiving region of the retaining portion and a hollow needle extending into the hose receiving region of the retaining portion for penetrating a supply hose held in the retaining portion to create a fluid communication path between an interior of the needle and an interior of a supply hose held in the retaining portion.

The needle may be mounted for movement relative to the retaining portion between a retracted position and an extended position in which the needle extends into the hose receiving region.

The connector may comprise a needle drive arrangement for driving the needle towards the extended position.

The connector may further comprise a water outlet portion for accepting water from the interior of the needle and passing water out of the connector. The water outlet portion may comprise a sealing clamp arrangement for connecting an outlet component to the irrigation connector.

The irrigation connector and spike may comprise complementary attachment portions allowing the connector to be mounted on the spike and the orientation of the connector to be varied relative to the spike.

In some embodiments the attachment portion on the connector extends at least part way around the retaining portion so as to present a plurality of different angularly spaced attachment regions at which the attachment portion of the spike may be selectively located.

The attachment portion on the connector may comprise a runner accepted in the slot in the attachment portion on the spike.

The complementary attachment portions may comprise indexing means for indexing relative movement of the attachment portions as the orientation of the connector is altered relative to the spike.

The indexing means may comprise a series of projections and recesses on the attachment portion provided on the connector, and a projection on the attachment portion on the spike, which is arranged to ride over a respective one of the projections on the connector as the connector is moved from one indexed position, determined by a respective recess to another.

According to another aspect of the invention there is provided an irrigation system comprising at least two ground spikes as defined above, and at least two of: a length of supply hose, a length of micro tube, an irrigation connector, and an irrigation outlet component, wherein each of said two ground spikes holds a respective different one of said at least two of: a length of supply hose, a length of micro tube, an irrigation connector, and an irrigation outlet component.

BRIEF DESCRIPTION OF THE DRAWINGS

Embodiments of the present invention will now be described, by way of example only, with reference to the accompanying drawings, in which:

—FIG. 5A shows the spike holding micro tube, FIG. 5B shows the spike holding supply hose, FIG. 5C shows the spike holding an irrigation connector and FIG. 5D shows the spike holding a dripper unit.

DETAILED DESCRIPTION

Figure 1:
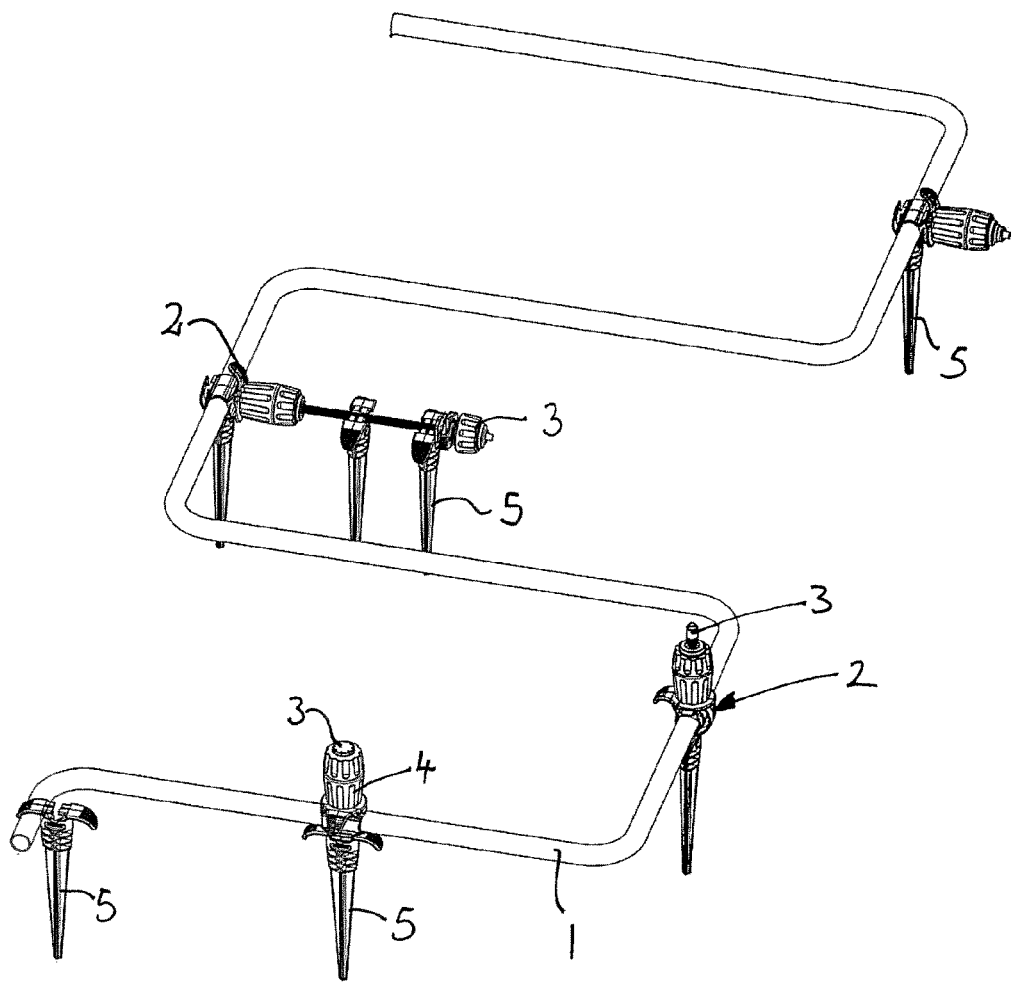
FIG. 1 schematically shows a micro irrigation system.

FIG. 1 schematically shows a micro irrigation system of the type which may be used for watering plants in, for example, a domestic garden or other similar situation. The micro irrigation system comprises a supply hose 1 which is connected to a water supply (not shown). Mounted on the supply hose 1 are a plurality of irrigation connector arrangements 2 which serve to make a connection to the water supply hose such that water flowing in the water supply hose can be tapped off by the irrigation connector arrangement 2 and allowed to leave the supply hose 1 for watering purposes. Each irrigation connector arrangement 2 may have connected to it a respective water outlet component 3 such as, for example, a further length of hose or tubing, a dripper unit, a sprinkler unit, or so on. Each irrigation connector arrangement 2 comprises an irrigation connector 4 and ground spike 5 for securing it in place. The irrigation system comprises further ground spikes 5 for directly securing other components such as the supply hose 1, micro tube, dripper units, sprinkler units and so on.

In such an irrigation system, the water supply hose 1 and outlet components 3 may be standard commercially available products. For example, the water supply hose 1 may be a length of standard garden hose.

Figure 2:
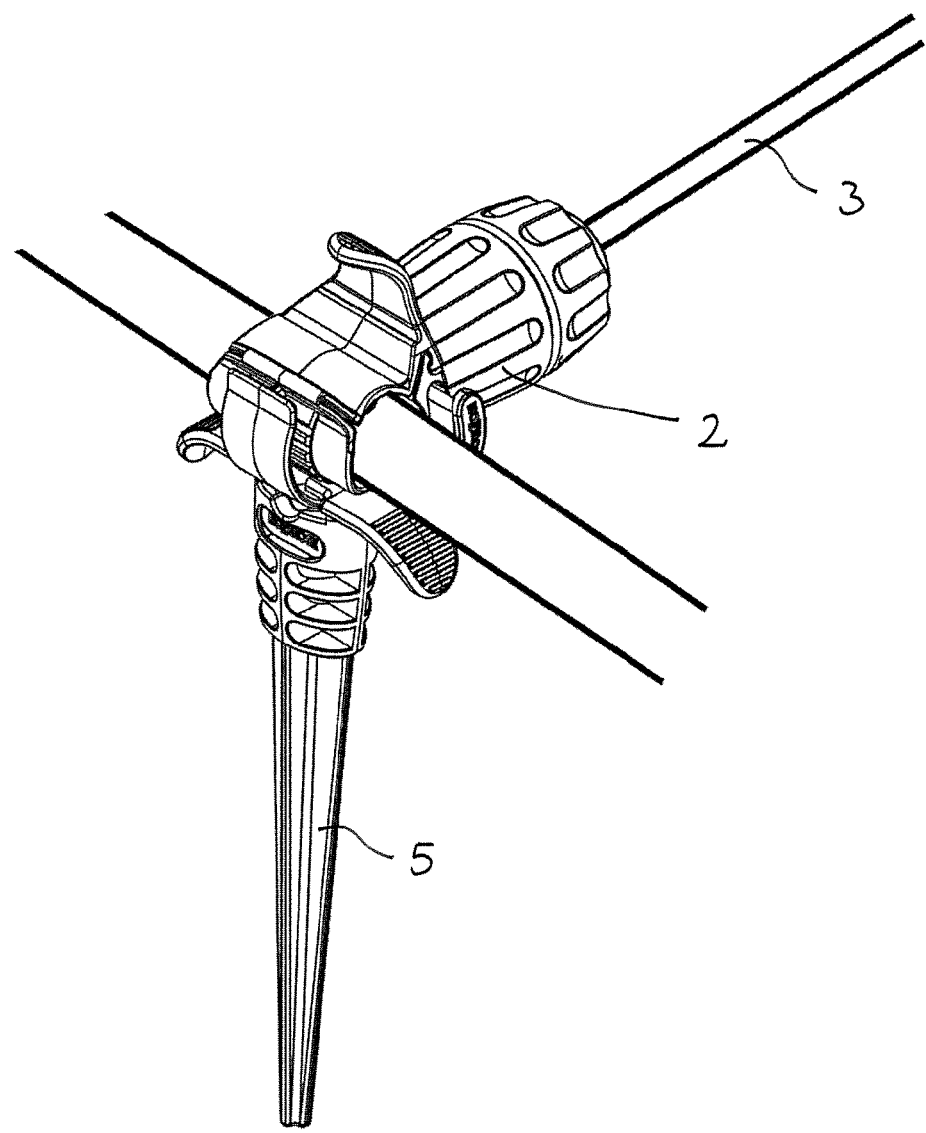
FIG. 2 schematically shows one irrigation connector arrangement mounted on a supply hose, which together form part of the irrigation system shown in FIG. 1.
Figure 3A:
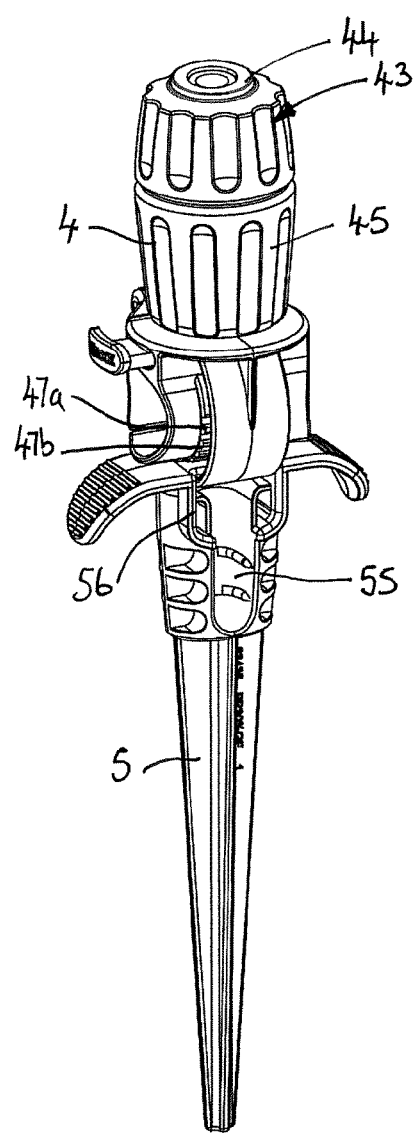
FIGS. 3A and 3B schematically show a needle connector arrangement of the type used in the irrigation system of FIG. 1, with FIG. 3A showing an irrigation connector of the irrigation connector arrangement in a vertical orientation and FIG. 3B showing the irrigation connector in a horizontal orientation.

FIG. 2 shows one of the irrigation connector arrangements of FIG. 1 in more detail whilst mounted on the water supply hose 1. On the other hand, FIGS. 3A and 3B show the irrigation connector arrangement 2 in isolation and FIG. 4 shows the ground spike 5 alone.

As mentioned above, each irrigation connector arrangement comprises an irrigation connector 4 mounted to a ground spike 5 for securing the irrigation connector 4 and hence a carried supply hose in position, as schematically illustrated in FIGS. 1 and 2. In the present embodiment the irrigation connector 4 is arranged for movement relative to the ground spike 5, such that the irrigation connector 4 may be orientated at different orientations relative to the spike 5. For example, in FIG. 3A the irrigation connector 4 is shown in an upright (or vertical) position whereas in FIG. 3B the irrigation connector 4 is shown in a horizontal position.

The irrigation connector 4 comprises a hose retaining portion 41 for holding the supply hose 1 as shown in FIGS. 1 and 2. The needle connector 4 further comprises a hollow needle 6 with an open side window 61, which is arranged for projecting into a hose receiving region of the hose retaining portion 41, so as to penetrate into the interior of a supply hose 1 when located in the hose retaining portion 41.

Figure 3B:
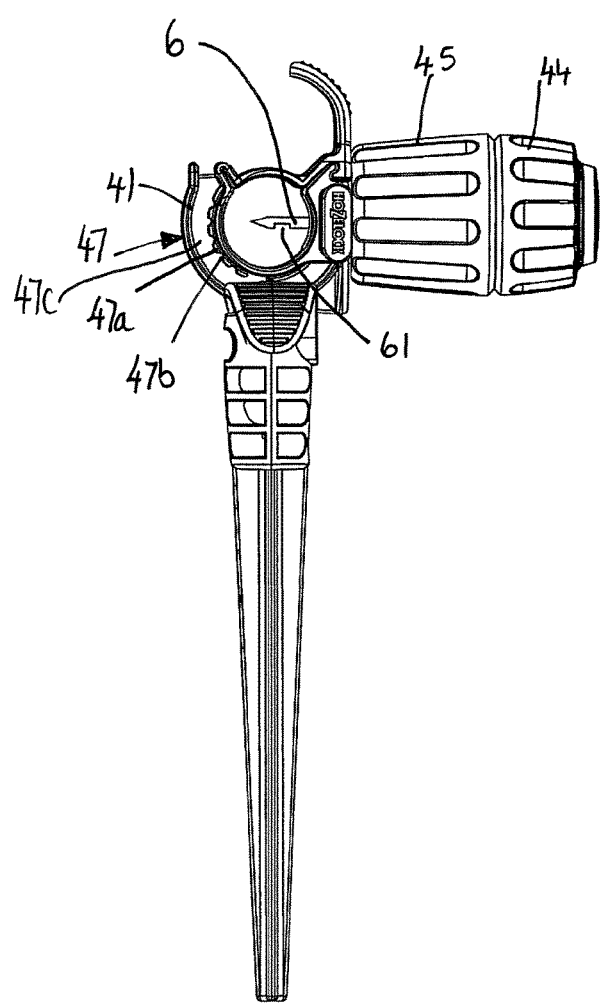
Figure 4:
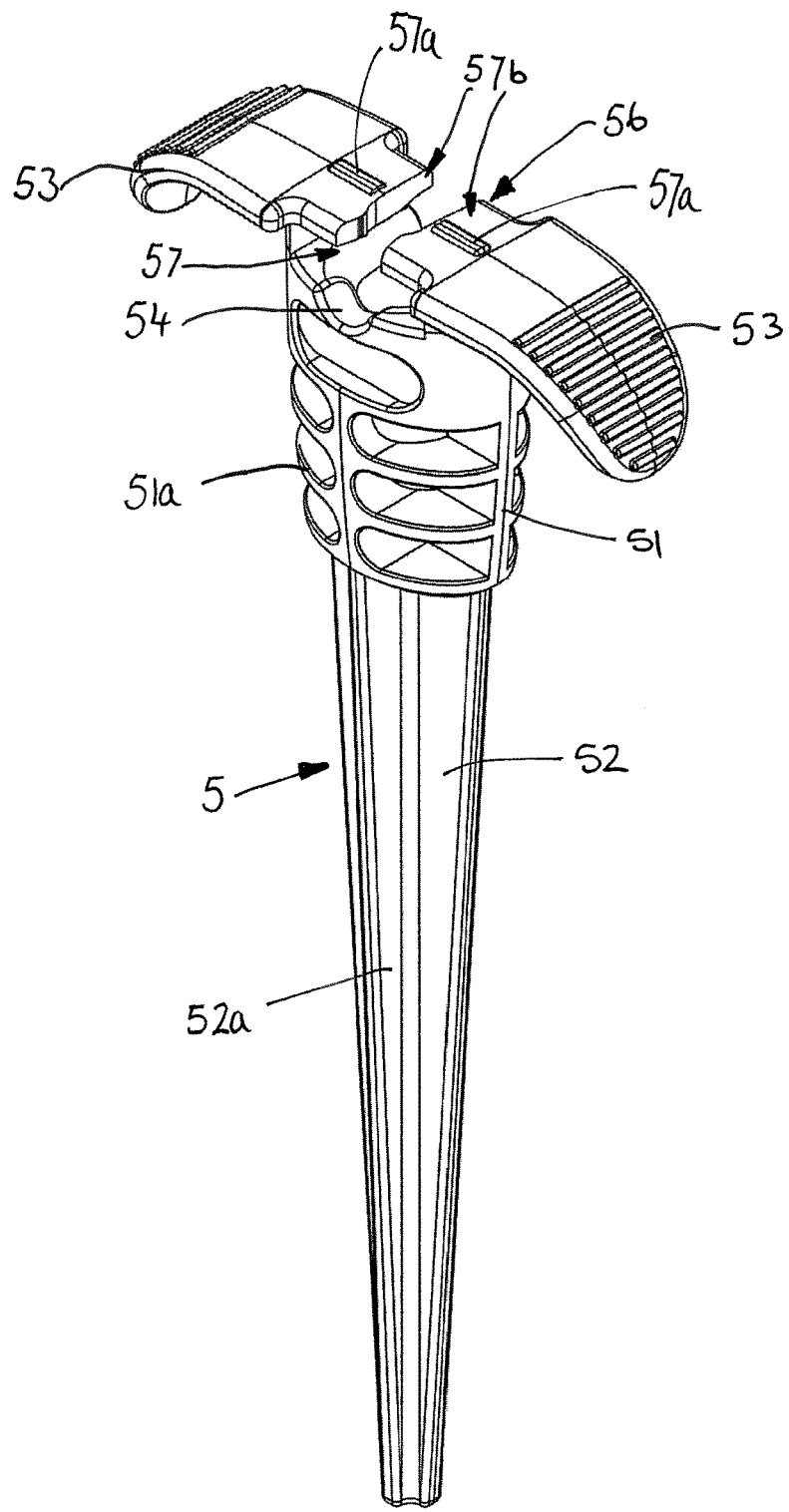
FIG. 4 shows a ground spike which forms part of the irrigation connector arrangement shown in FIGS. 3A and 3B.

The irrigation connector 4 comprises a drive mechanism 45 for driving the hollow needle 6 from a retracted position, where the needle 6 does not extend into the hose receiving region, towards the extended position, shown in FIG. 3B, where it can penetrate through the wall of a carried supply hose.

The irrigation connector 4 comprises a water outlet portion 43 which comprises a sealing clamp portion 44 for connecting an outlet component 3 such as a dripper, sprinkler unit or tubing to the irrigation connector 4.

When the hollow needle 6 penetrates into the interior of a carried supply hose 1, there is a fluid communication path between the interior of the supply hose 1 and the interior of the irrigation connector 4 and any water outlet component 3 (see FIGS. 1 and 2) held in the irrigation connector 4.

Referring particularly to FIG. 4, the ground spike 5 comprises a main body portion 51 from which a spike portion 52 projects. The spike portion 52 is arranged for penetrating ground to secure the ground spike and items held by it. The spike portion 52 comprises a strengthening rib 52a. A pair of securing lugs 53 project from the main body 51. These lugs project from opposing sides of the main body 51 and are useful for retaining supply hose as well as for use by a user when removing the ground spike 5 from the ground. Rib portions 51a are also provided on the main body 51 to assist the user grip of the ground spike 5.

The main body 51 comprises a part circular cut-out 54 which is arranged as a micro tube grip, thus allowing the ground spike 5 to secure micro tube in position. A groove 55 (see FIG. 3A) is provided in one side of the main body 51 which is arranged for guiding and/or gripping micro tube which is connected to an irrigation outlet component held in an irrigation outlet component mounting portion 56 of the spike. The ground spike 5 also comprises an attachment portion 57 for use in attaching the irrigation connector 4 of the type described above to the ground spike 5.

The lugs 53, part circular cut-out 54, groove 55, mounting portion 56 and attachment portion 57 can each be considered as respective holding portions. These holding portions differ from one another and are arranged for holding respective different components which will be used in an overall irrigation system.

FIGS. 5A-5D show examples of a ground spike 5 being used to hold different components and making use of these different holding portions.

Figure 5A:
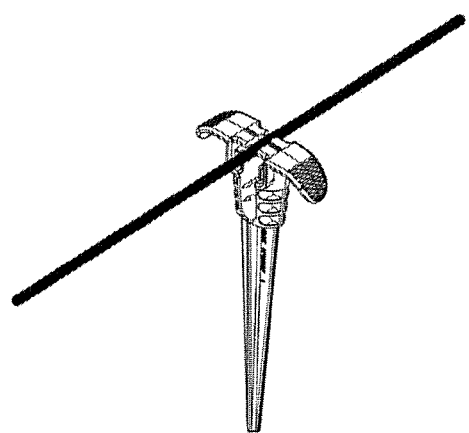
FIGS. 5A to 5D show the ground spike of FIGS. 4A and 4B being used in a number of different ways
Figure 5B:
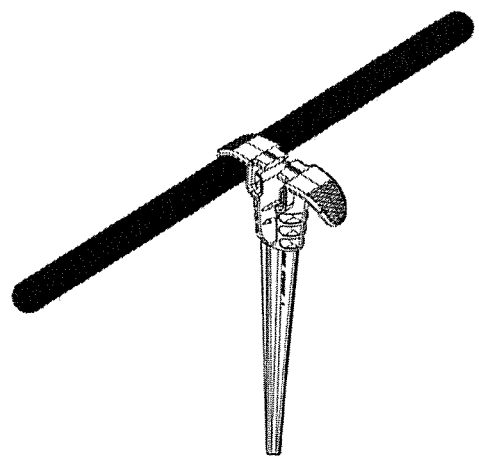

The lugs 53 define a space between the main body portion 51 and the respective lug 53 which can act as a supply hose receiving portion. It will be noted that this region has a mouth of a dimension which is chosen for allowing the insertion of a supply hose diameter such that the lug 53 may be located over a supply hose when the ground spike is driven into the ground. FIG. 5B shows a ground spike 5 holding supply hose 1 in this way.

On the other hand, the part circular cut-out 54 and groove 55 are arranged to have a dimension which is suitable to accept micro tube. Thus the part circular cut-out 54 has a mouth of a smaller dimension than that between the lugs 53 and the main body 51. FIG. 5A shows micro tube located and held in the part circular cut-out 54.

Figure 5C:
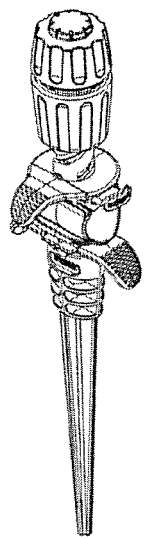
Figure 5D:
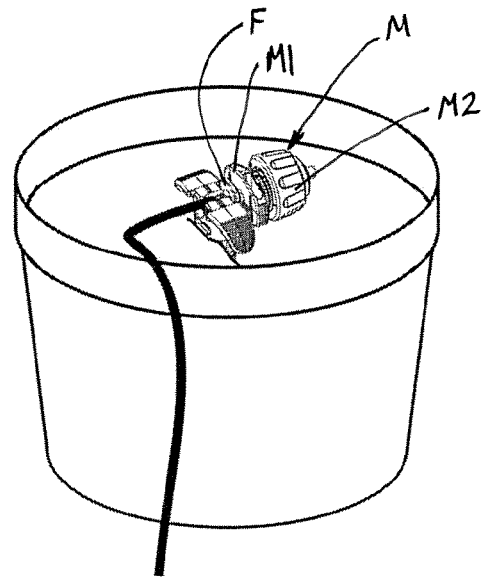

FIG. 5C shows an irrigation connector 4 held in the attachment portion 57 of the ground spike 5 whilst FIG. 5D shows a multi-function unit M arranged as a dripper unit held in the irrigation outlet component mounting portion 56.

The ground spike 5 comprises a pair of arms 57b which provide the attachment portion 57 for attaching an irrigation connector 4 to the spike 5. The arms 57b project from the main body 51 of the ground spike 5 towards one another. As such they define a first slot between the arms 57b and the main body 51 and a second slot between the arms 57b themselves. The arms 57b also provide a location at which a irrigation component can be attached. This is supplementary to the irrigation component mounting portion 56 provided in the side of the main body 51. In both cases a flange F (see FIG. 5D) of the irrigation component can be slid into engagement with a slot provided in the spike 5. The two mounting portions allow an irrigation component to be connected at respective different orientations—e.g one vertical and one horizontal.

As mentioned above, the irrigation connector 4 is arranged to be orientatable at different angles relative to the ground spike 5. The irrigation connector 4 comprises an attachment portion 47 which is arranged to be complimentary with the attachment portion 57 on the ground spike 5. These complementary attachment portions 47, 57 allow the connector 4 to be mounted on the spike 5 and the orientation of the connector 4 to be varied relative to the spike 5. The attachment portion 47 on the irrigation connector 4 extends part way around the retaining portion 41 so as to present a plurality of different angularly spaced attachment regions at which the attachment portion 57 of the spike 5 may be selectively located.

The attachment portion 47 of the irrigation connector 4 comprises a runner 47 which is accepted in the slots defined by the arms 57 on the spike 5. The attachment portions 47, 57 comprise indexing means for indexing relative movement of the attachment portions as the orientation of the irrigation connector 4 is altered relative to the spike 5. The attachment portion 47 on the irrigation connector 4 comprises a series of projections and recesses 47a and 47b (see FIGS. 3A and 3B) and the attachment portion on the spike comprises projections 57a. The projections on the spike 5 are arranged to ride over a respective one of the projections 47a on the irrigation 4 connector as the irrigation connector 4 is moved from one index position determined by a respective one of the recesses 47b to another. When the spike 5 is mounted on the irrigation connector 4, the runner 47 is captured in the slots defined by the arms 57. The runner 47 is mounted on a supporting stem 47c and projects from either side of the stem. The arms 57b of the attachment portion 57 on the spike wrap around the extending portions of the runner and capture the runner 47. Resilience in the arms 57b allows the indexing movement. The projections 57a on the spike 5 act on a face of the retaining portion 41 which is opposite the extending portions of the runner.

In an alternative the projections 57a may be omitted. This reduces the force needed to move between indexed positions.

The multi-function unit M shown in FIG. 5D comprises a body portion M1 and a nut portion M2. The body portion M1 has a spigot (not shown) arranged to connect to micro-tube and comprises the flange F mentioned above which can be accepted and held in a spike 5. In FIG. 5D the multi-function unit M is held in a first (horizontal) orientation in the spike 5. In this case the flange F is held in the irrigation component mounting portion 56. The unit M may also be held in a second (vertical) orientation. In this case the flange F is held by the arms 57b in the above mentioned slot. The nut portion M2 provides the function for the unit M and can be tightened onto the body portion M1. In FIG. 5D the nut portion is a dripper nut portion. In alternatives the unit may be provided with a shrubbler nut (providing a mini-sprinkler outlet) or a clamping nut to allow connection to another piece of micro tube.

Figure 6A:
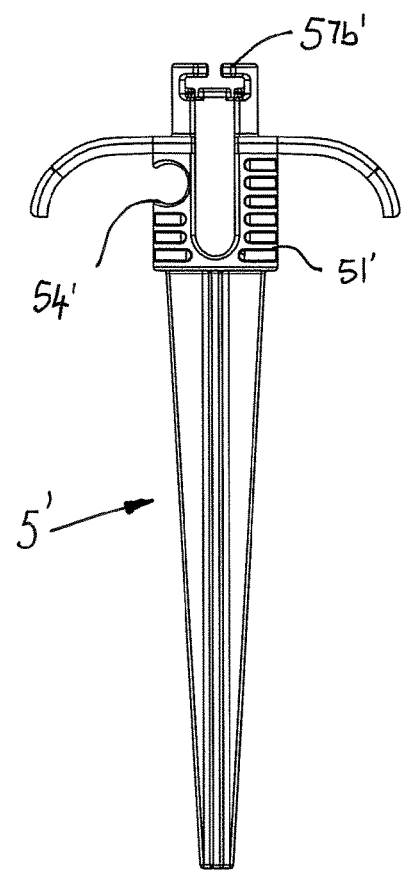
FIGS. 6A and 6B show an alternative ground spike.
Figure 6B:
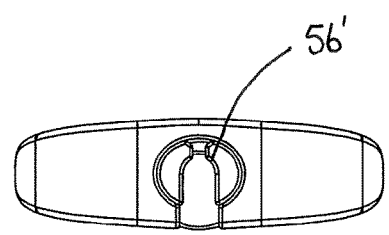

FIGS. 6A and 6B show an alternative spike 5' which is similar to that described above but has a different arrangement in the main body 51' and attachment arms 57b'.

In this case, the part circular cut-out 54' is provided in the side of the main body 51'. Further the arms 57b' are L-shaped and project from the main body with their respective foot uppermost. As best seen in FIG. 6B, the free ends of the L-shaped arms 57b' are shaped so as to provide a keyhole shaped slot in what is the upper surface of the spike. This keyhole shaped slot provides the irrigation component mounting portion 56' in this case. A dripper unit such as the one shown in FIG. 5D may be slid into engagement with the large dimension portion of the keyhole shape slot 56'.

The invention claimed is:

1. An irrigation system ground spike for securing at least one component of an irrigation system, the ground spike comprising a spike portion for penetrating soil to hold the ground spike in position and at least two holding portions, each holding portion for holding a respective component of an irrigation system wherein a first of the two holding portions differs from a second of the two portions so facilitating use of the spike for selectively securing respective different components, wherein the ground spike comprises a main body portion from which the spike portion projects, one of the holding portions comprises a supply hose securing lug which projects from the main body portion, the ground spike comprises a second supply hose securing lug such that there is a pair of hose securing lugs each projecting from a respective opposite side of the main body, the lugs configured to retain supply hose and for use by a user when removing the ground spike from the ground, and each lug defines a space between the main body portion and the respective lug which acts as a supply hose receiving portion.

2. An irrigation system ground spike according to claim 1 in which one of the holding portions is arranged for holding tube or hose of a first diameter and another of the holding portions is arranged for holding tube or hose of a second diameter.

3. An irrigation system ground spike according to claim 1 in which the ground spike comprises any one of, or any combination of: a micro tube grip, a supply hose securing lug, an irrigation connector attachment portion for attaching an irrigation connector to the ground spike, an irrigation outlet component mounting portion for mounting an irrigation outlet component on the ground spike.

4. An irrigation system ground spike according to claim 1 in which the ground spike is of a single piece of material.

5. An irrigation system ground spike according to claim 1 in which one of the holding portions comprises a part circular cut out in the main body portion, which cut out is for holding a micro tube.

6. An irrigation system ground spike according to claim 1 in which one of the holding portions comprises a part circular cut out in the main body portion which cut out is for holding a micro tube and in which the part circular cut out defines a tube receiving region having a mouth through which the tube may be introduced whilst the securing lug and main body define a hose receiving region having a mouth through which the hose may be introduced, wherein the mouth of the tube receiving region is smaller than the mouth of the hose receiving region.

7. An irrigation system ground spike according to claim 1 in which the ground spike comprises a pair of opposing arms extending from the main body portion, wherein an irrigation connector attachment portion and/or an irrigation outlet component mounting portion comprise the opposing arms.

8. An irrigation system ground spike according to claim 7 in which the arms define a first slot between the pair of arms on the one hand and the main body portion in the other hand.

9. An irrigation system ground spike according to claim 8 in which the arms define a second slot transverse to the first slot and between the arms themselves.

10. An irrigation system ground spike according to claim 1 in which a groove is provided in the main body portion to act as a guide for micro tube.

11. An irrigation connector arrangement comprising ground spike according to claim 1 and an irrigation connector attached to the ground spike.

12. An irrigation connector arrangement according to claim 11 in which the irrigation connector and ground spike comprise complementary attachment portions allowing the connector to be mounted on the spike and the orientation of the connector to be varied relative to the spike.

13. An irrigation connector arrangement according to claim 12 in which the attachment portion on the connector extends at least part way around a retaining portion of the connector so as to present a plurality of different angularly spaced attachment regions at which the attachment portion of the spike may be selectively located.

14. An irrigation connector arrangement according to claim 13 in which the complementary attachment portions comprise indexing means for indexing relative movement of the attachment portions as the orientation of the connector is altered relative to the spike.

15. An irrigation system comprising at least two ground spikes according to claim 1, and at least two of: a length of supply hose, a length of micro tube, an irrigation connector, and an irrigation outlet component, wherein each of said two ground spikes holds a respective different one of said at least two of: a length of supply hose, a length of micro tube, an irrigation connector, and an irrigation outlet component.

16. An irrigation connector arrangement comprising:
a ground spike for securing at least one component of an irrigation system, the ground spike comprising a spike portion for penetrating soil to hold the ground spike in position and at least two holding portions, each holding portion for holding a respective component of an irrigation system wherein a first of the two holding portions differs from a second of the two portions so facilitating use of the spike for selectively securing respective different components;
an irrigation connector attached to the ground spike;
wherein the irrigation connector and ground spike comprise complementary attachment portions allowing the connector to be mounted on the spike and the orientation of the connector to be varied relative to the spike, and
wherein the attachment portion on the connector extends at least part way around a retaining portion of the connector so as to present a plurality of different angularly spaced attachment regions at which the attachment portion of the spike may be selectively located.

17. An irrigation connector arrangement comprising:
a ground spike for securing at least one component of an irrigation system, the ground spike comprising a spike portion for penetrating soil to hold the ground spike in position and at least two holding portions, each holding portion for holding a respective component of an irrigation system wherein a first of the two holding portions differs from a second of the two portions so facilitating use of the spike for selectively securing respective different components;
and
an irrigation connector attached to the ground spike;
wherein the irrigation connector and ground spike comprise complementary attachment portions allowing the connector to be mounted on the spike and the orientation of the connector to be varied relative to the spike, and
wherein the complementary attachment portions comprise indexing means for indexing relative movement of the attachment portions as the orientation of the connector is altered relative to the spike.

* * * * *